United States Patent [19]
Shaffer

[11] Patent Number: 5,769,526
[45] Date of Patent: Jun. 23, 1998

[54] UTILITY LIGHT FOR USE WITH MOTOR VEHICLE

[76] Inventor: Daniel L. Shaffer, 5443 260th St., Sanborn, Iowa 51248

[21] Appl. No.: 515,915

[22] Filed: Aug. 16, 1995

Related U.S. Application Data

[63] Continuation of Ser. No. 174,153, Dec. 27, 1993, abandoned.

[51] Int. Cl.⁶ ........................................ B60Q 1/00
[52] U.S. Cl. ........................ 362/80; 362/83.3; 362/396; 362/398
[58] Field of Search ................. 362/61, 833, 80, 362/74, 427, 285, 287, 396, 397, 83.3, 398; 439/34, 35, 36, 217, 218, 290, 291, 222; 280/422; 340/471, 472, 473

[56] References Cited

U.S. PATENT DOCUMENTS

| | | | |
|---|---|---|---|
| 1,695,987 | 12/1928 | Steindorff | 362/396 |
| 2,511,893 | 6/1950 | Alden | 362/83.3 X |
| 2,579,653 | 12/1951 | Dawley | 362/80 X |
| 2,675,545 | 4/1954 | Wolper | 362/397 X |
| 2,875,324 | 2/1959 | Camp et al. | 362/398 |
| 4,005,313 | 1/1977 | Tibbits | 280/422 X |
| 4,057,310 | 11/1977 | Young | 439/35 |
| 4,654,757 | 3/1987 | Birkhauser | 362/80 X |
| 4,903,174 | 2/1990 | Busby | 362/61 |
| 5,103,205 | 4/1992 | Halligan | 340/473 |
| 5,157,591 | 10/1992 | Chudzik | 362/61 X |
| 5,184,960 | 2/1993 | Hopkins et al. | 439/35 |
| 5,195,813 | 3/1993 | Brown | 362/61 |

*Primary Examiner*—Thomas M. Sember
*Attorney, Agent, or Firm*—Emrich & Dithmar

[57] ABSTRACT

A utility light for use with a motor vehicle for illuminating the area directly behind the vehicle, includes a floodlamp having a power cord terminating in a plug of the type that can be plugged into the coupler of a conventional trailer lighting connection system to enable the utility light to be connected to a source of electrical power at the rear of the vehicle. The utility light includes a mounting device. The such as a magnetic support, or a clamping device, for mounting the utility light on the motor vehicle.

17 Claims, 3 Drawing Sheets

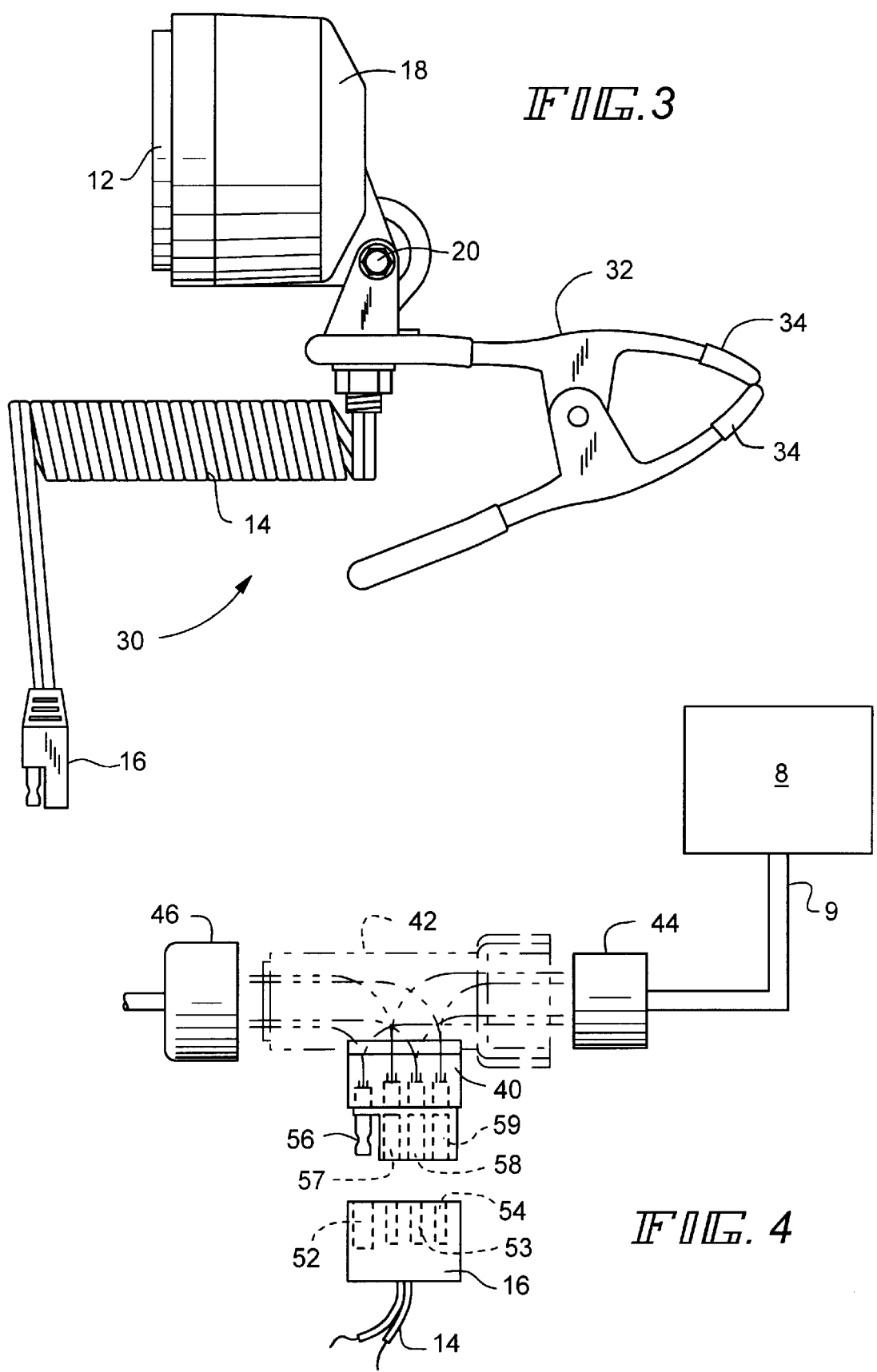

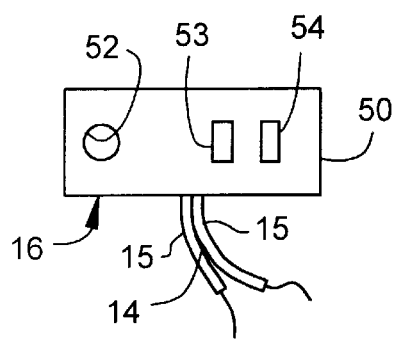
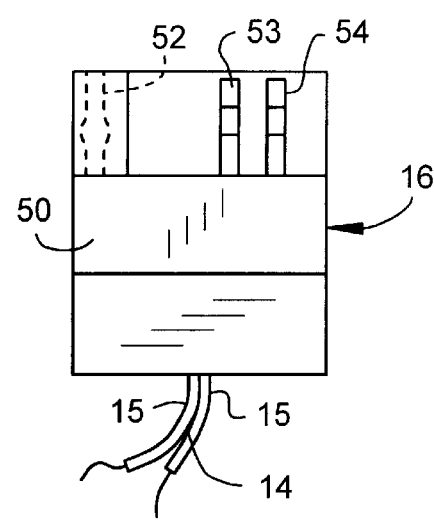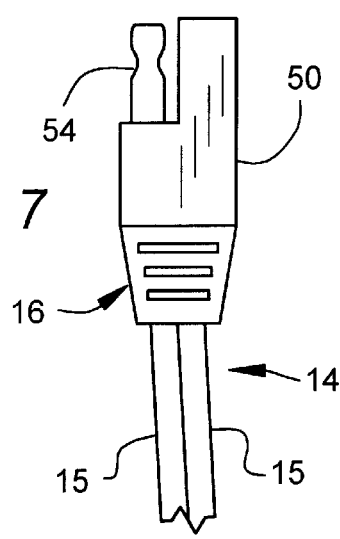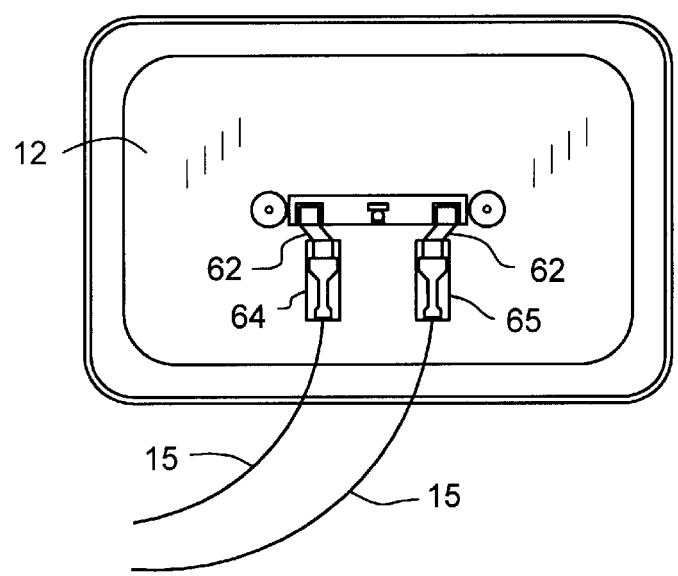

UTILITY LIGHT FOR USE WITH MOTOR VEHICLE

This a continuation of application Ser. No. 174,153 of Dec. 27, 1993 now abandoned.

BACKGROUND OF THE INVENTION

This invention relates to utility lights, and more particularly, to a portable utility light for use with motor vehicles, and the like. Conventionally, portable utility lights for use with vehicles are adapted to plug into the cigarette lighter of the vehicle for energization. This has the disadvantage that the power cord for the lamp must pass through an open doorway or window of the vehicle. More importantly, the cigarette lighter, which is the source of electrical power for the light, is located inside the vehicle near the front of the vehicle so that a long power cord is required if the light is to be used to illuminate the area behind the vehicle.

In another known arrangement for a portable utility light, the power cord is provided with clip-on connectors for connecting the light directly to the vehicle battery, which is made accessible by maintaining the hood of the vehicle open while the light is in use. This arrangement also requires that the light have a long power cord if the light is to be used to illuminate the area directly behind the vehicle, and, accordingly, has found limited acceptance.

SUMMARY OF THE INVENTION

The present invention provides a utility light for use with motor vehicles and the like. In accordance with the present invention, the utility light is adapted to be plugged into a power outlet that is located at the rear of the vehicle. The utility light includes a retractable power cord which is terminated in a plug that is adapted to be plugged into the socket of a T-shaped coupler or connector of a conventional trailer lighting connection system that is used to connect the electrical wiring of a trailer lighting system to the rear electrical wiring of the vehicle lighting system. The utility light is a floodlight having a suitable mounting arrangement, such as a magnetic base or a clamping device, which permits the utility light to be mounted on the rear of the vehicle and directed at the area to be illuminated. Thus, the utility light is particularly useful for illuminating the area directly behind the vehicle for loading and unloading the vehicle and any kind of trailer including construction trailers, or for illuminating the area behind the vehicle while the vehicle is backing up. The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For purpose of facilitating an understanding of the invention, there is illustrated in the accompanying drawings a preferred embodiment thereof, from an inspection of which, when considered in connection with the following description, the invention, its construction and operation, and many of its advantages will be readily understood and appreciated.

FIG. 3 is a side elevation view of a further embodiment of utility light provided by the present invention;

FIG. 4 is a view of the plug of the utility light shown inserted into the T-connector of a trailer light electrical connection system.

FIG. 5 is a top plan view of the plug of the utility light shown in FIG. 1;

FIG. 6 is a front elevation view of the plug;

FIG. 7 is a side elevation view of the plug; and

FIG. 8 is a view of the back side of the lamp, showing the connections to the lamp.

DESCRIPTION OF PREFERRED EMBODIMENTS

Figure 1:
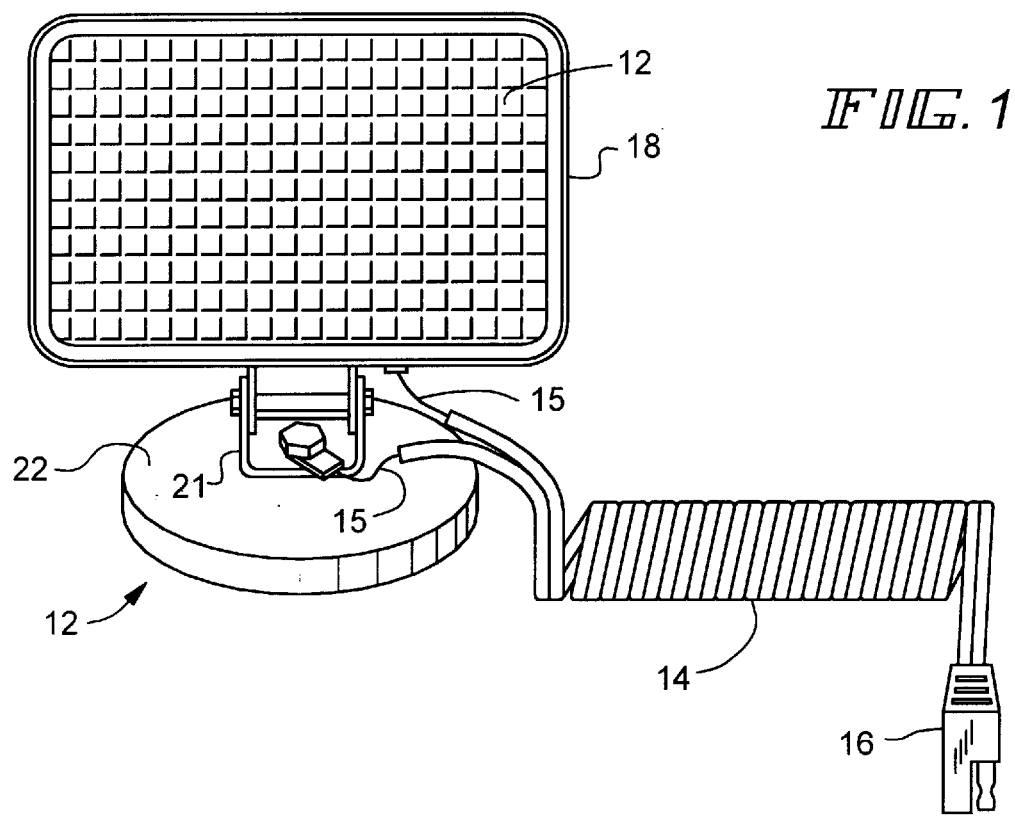
FIG. 1 is a front elevation view of a utility light provided by the present invention.
Figure 2:
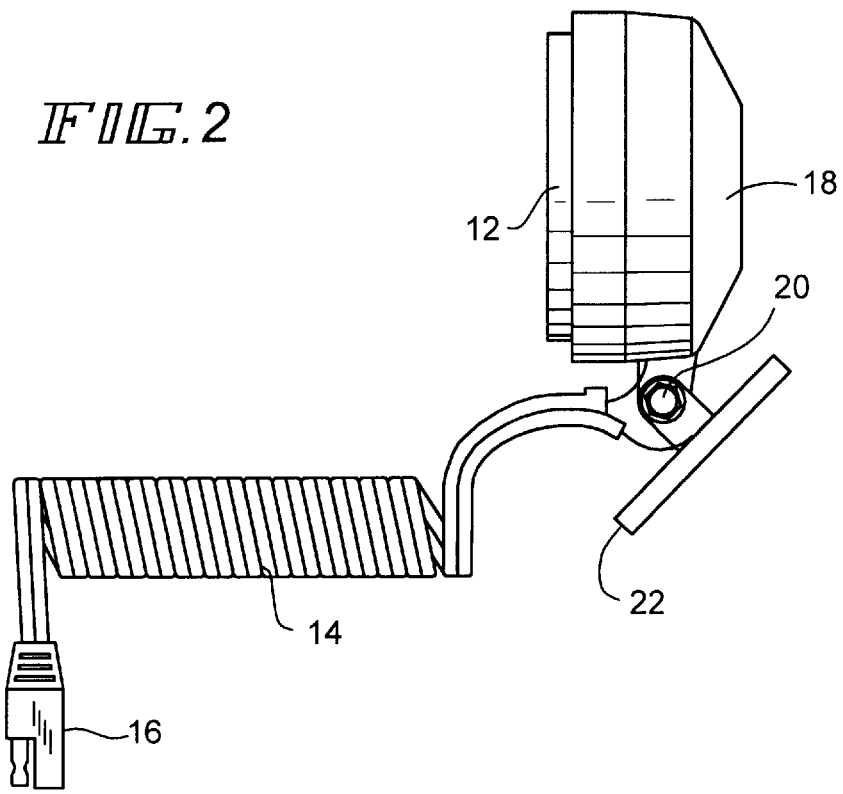
FIG. 2 is a side elevation view of the utility light shown in FIG. 1.

Referring now to FIGS. 1 and 2 of the drawings, the utility light 10 provided by the present invention includes a lamp 12 having a ten foot retractable power cord 14 which is terminated by a plug 16. By way of example, the power cord may be a retractable cord and may be approximately ten feet in length. The lamp 12 is mounted in a housing 18 which is pivotally secured by a pivot 20 and bracket 21 to a mounting plate 22. The utility light is adapted to be plugged into a power outlet that is located at the rear of the motor vehicle 8 with which it is used. The mounting plate is made of a magnetic material. The mounting plate permits the utility light to be mounted on any metal portion of the vehicle, which may be a recreational vehicle, a passenger vehicle, a van, a pick up truck, or any type of motor vehicle having includes a vehicle lighting system that a plug and socket connection at the rear of the vehicle. The pivot 20 permits the lamp housing to be pivoted back and forth in one plane, i.e., up and down if the mounting base is mounted on the vehicle oriented vertically. The magnetic holder or mounting plate 22 simplifies mounting the light on the vehicle and is easily attached to and detached from the vehicle. Alternatively, the light mounting mechanism may comprise a suction cup member.

In accordance with a further embodiment of the utility light 30, illustrated in FIG. 3, the utility light includes a clamp 32 which has rubber coated, spring loaded jaws 34 for attaching the utility light 30 to a surface of the vehicle, such as a wind deflector, a toper door, or a trunk lid for example, depending on the type of vehicle with which the utility light is being used.

Referring to FIG. 4, the plug 16 is adapted to be received in the receptacle or tap 40 of a conventional polarized T-shaped coupler device 42 of a conventional trailer lighting connection system which connects the electrical wiring of a trailer lighting system to the rear electrical wiring system of the vehicle lighting system. The coupler device 42 is interposed between the mating plug 44 and socket 46 of the rear electrical wiring 9 that conducts power to the tail lights and the parking lights of the vehicle, for example. Coupler 42 has a grounded polarizing contact 56 and terminals 57, 58 and 59. In installing a conventional trailer lighting connection system, the plug 44 is disconnected from the socket 46 and the coupler 42 is interposed between the plug 44 and socket 46, as is known in the art. That is, the coupler 42 is plugged into the socket 46, and the plug 44 is plugged into the coupler 42, to complete the electrical circuit between the source of battery power through wiring to the tail lights and the parking lights of the vehicle 8 and to provide the tap 40 for connecting electrical power for the trailer lighting system.

Referring to FIGS. 5–7, the plug 16 has a rectangular body 50 with a socket 52 to receive the grounded polarizing terminal 56 and two prongs 53 and 54. The prongs are connected to the two wires 15 of the power cable 14. The spacing between the prongs as mounted in the body 50 is set to ensure that when the plug 16 is plugged into the coupler, the prongs engage the two terminals 56 and 57 of the coupler (FIG. 4) that is connected in the parking light circuit of the vehicle electrical circuit. Preferably, the plug 16 is molded to the power cord.

Referring to FIG. 4, the electrical contacts 56 and 57 of the tap 40 are connected to the vehicle parking light circuit, and in some systems also to the vehicle brake light circuit, so that the trailer lights are lit when the vehicle parking light circuit is energized. Consequently, with the plug 16 plugged into the tap 40 provided by coupler 42, the utility light 10 is lit by turning on the vehicle parking lights. In the case where the trailer is connected to the vehicle, it will be necessary to disconnect the plug of the trailer lights from the coupler to permit the utility light to be plugged into the coupler, but generally the trailer lights are disconnected when backing up the trailer, as when loading or unloading a boat. The utility light provides all the light necessary to perform the task at hand.

Although the coupler 42 provides four or more terminals, the utility light 10 includes two prongs and a receptor for the grounded polarizing terminal, and requires connection to only one circuit of the vehicle electrical system, which is the exemplary embodiment in the electrical circuit for the parking lights of the vehicle. If the vehicle is not equipped with a four prong socket in the conventional manner, an adapter can be provided which has a two prong socket at one end to receive plug 16 and a plug at the other end that can be plugged into the socket. The coupler device 42 has receptors or sockets 58 and 59 which are aligned with the prongs 53 and 54 when the ground contact 56 of the coupler device 32 is aligned with receptor 52 of plug 16 so that the plug 16 is properly connected when it is inserted into the coupler or adapter 42.

The lamp 12 is a conventional 12 volt halogen floodlamp. Referring to FIG. 8, which is a view of the back of the lamp 12, the lamp 12 includes posts or terminals 61 and 62 for connection to the power cord. The two wires 15 of the power cord 14 terminate in spade lugs 64 and 65, which facilitate connection of the power cord to the lamp terminals 61 and 62, respectively. Alternatively, the lamp may have a ground connection from one of its terminals to the casing so that one of the spade terminals can be connected to the metal portion of the support as illustrated in FIG. 1.

Thus, it has been shown that the present invention provides a utility light for use with a motor vehicle and which is particularly suitable for illuminating the area directly behind the vehicle. The present invention provides illumination of any towed vehicle, such as a boat and the like. The utility light is adapted to be connected to a source of electrical power at the rear of the vehicle with which it is used. The utility light includes a floodlamp having a power cord that terminates in a plug of the type that can be plugged into the coupler of a conventional trailer lighting connection system for motor vehicles. The utility light includes a suitable mounting device, such as a magnetic support member, a suction cup or a clamping device, for securing the utility light to the vehicle. Although the utility light has been described with reference to preferred embodiments, it is to be understood that the invention is not limited thereto and various changes and modifications can be made without departing from the spirit and scope of the invention as defined in the following claims.

I claim:

1. A utility light for use with a vehicle lighting system, said vehicle lighting system including at least one of a vehicle brake light circuit, a vehicle turning signal light circuit, a vehicle parking signal light circuit and a coupler device connected in circuit with the vehicle lighting system, said coupler device including terminal means including first and second pairs of terminals and constituting a tap adapted to provide a source of electrical power from the vehicle lighting system, with said terminals of said first and second pairs of terminals of said tap being electrically connected to at least one of said vehicle light circuits, said utility light comprising: a lamp having a power cord electrically connected to said lamp for supplying power to said lamp, said power cord terminating in a plug, said plug including first and second prongs and being structurally arranged to be plugged into said tap of said coupler device to selectively engage terminals of only one of said pairs of terminals of said coupler device to connect said lamp in circuit with the vehicle lighting system to provide electrical power to said lamp when one of said vehicle light circuits is energized.

2. The utility light according to claim 1, wherein said plug of said power cord has a generally rectangular body, with said first and second prongs mounted in said body.

3. The utility light according to claim 1, wherein said terminals of said one pair are electrically connected to the vehicle parking light circuit of the vehicle lighting system, whereby electrical power is supplied to said lamp when the parking light circuit of the vehicle lighting system is energized.

4. The utility light according to claim 3, including mounting means for mounting said lamp on said vehicle.

5. The utility light according to claim 4, said mounting means is a magnetic member.

6. The utility light according to claim 4, wherein said mounting means is a clamping means having first and second spring loaded clamping members constructed and arranged to be clamped to a surface of the vehicle.

7. The utility light according to claim 1, wherein said power cord has first and second connecting means for connecting to said lamp terminals.

8. The utility light according to claim 7, wherein said power cord is a retractable power cord approximately ten feet in length.

9. A utility light for use with a vehicle lighting system, said vehicle lighting system including a parking light circuit having a coupler device connected in circuit with the vehicle lighting system, said coupler device including terminal means including first and second pairs of terminals and constituting a tap adapted to provide a source of electrical power from said parking light circuit of the vehicle lighting system to the utility light, said utility light comprising: a lamp having first and second power terminals, a power cord including first and second power conductors with each conductor having a first and a second power terminal, with each conductor having a first end and a second end, said first end of said conductor being adapted for connection to respective first and second power terminals of said lamp, a plug including first and second prongs connected to said second ends of said conductors, said plug being structurally arranged to be plugged into said coupler device to selectively engage terminals of only one of said pair of terminals of said coupler device to complete an electrical circuit between said lamp and the vehicle lighting system for providing electrical power from the vehicle lighting system to said lamp when said parking light circuit is energized, and mounting means for mounting said lamp on the vehicle.

10. The utility light according to claim 9, wherein said plug of said second end of said conductors has a generally rectangular body with said first and second prongs mounted in said body.

11. The utility light according to claim 9, wherein said mounting means comprises a member of magnetic material.

12. The utility light according to claim 9, wherein said mounting means comprises clamping means having first and second spring loaded clamping members constructed and arranged to be clamped to a surface of the vehicle.

13. The utility light according to claim 9, wherein said power cord is a retractable power cord approximately ten feet in length.

14. For use with a vehicle having a vehicle lighting system that includes at least one of a vehicle's brake light circuit, a vehicle's turning signal light circuit and a vehicle's parking signal light circuit, the combination comprising: a coupler member structurally arranged to be connected in series with the vehicle lighting system, said coupling member including terminal means including first and second pairs of terminals and constituting a tap which provides electrical connections to at least one of said light circuits of the vehicle, and a utility light including a lamp having first and second power terminals, a power cord having a first end and a second end terminating in a plug, said first end having terminal means adapted for connection to said power terminals of said lamp, said plug of said second end being adapted to be selectively plugged into one pair of the first and second pairs of terminals of said coupler member to complete an electrical circuit between said lamp and said one electrical circuit of the vehicle lighting system for providing electrical power from the vehicle lighting systems to said one vehicle light circuit when said one vehicle light circuit is energized.

15. The utility light in accordance with claim 14, wherein said vehicle light circuit is a turning signal light circuit.

16. The utility light in accordance with claim 14, wherein said vehicle light is a parking signal light circuit.

17. The utility light in accordance with claim 14, wherein said vehicle light is a brake light circuit.

* * * * *